July 27, 1965     F. J. LOWEY     3,196,986
VEHICLE BRAKE Filed Sept. 4, 1962     5 Sheets-Sheet 2

INVENTOR.
FRANCIS J. LOWEY
BY
*Tillbury and Body*
ATTORNEYS

July 27, 1965     F. J. LOWEY     3,196,986
VEHICLE BRAKE Filed Sept. 4, 1962     5 Sheets-Sheet 3

INVENTOR.
FRANCIS J. LOWEY
BY
Tillberry and Body
ATTORNEYS

July 27, 1965 F. J. LOWEY 3,196,986
VEHICLE BRAKE
Filed Sept. 4, 1962 5 Sheets-Sheet 4

INVENTOR.
FRANCIS J. LOWEY
BY
Tillbury and Body
ATTORNEYS

United States Patent Office 3,196,986
Patented July 27, 1965

3,196,986
VEHICLE BRAKE
Francis J. Lowey, 1979 Wynwood Drive, Cleveland, Ohio
Filed Sept. 4, 1962, Ser. No. 221,218
13 Claims. (Cl. 188—77)

This is a continuation-in-part of application Serial No. 717,295, filed Feb. 21, 1958, now Patent No. 3,053,350.

This invention pertains to the art of vehicle friction brakes and more particularly to an external-band contracting type brake for vehicles.

The invention is particularly applicable to brakes of the type to be mounted on the wheels of an automobile and will be described with particular reference thereto although it will be appreciated that the invention has broader applications.

Automobile brakes normally consist of a metal cylinder or drum having an inwardly facing braking surface engaged by internally expanding brake shoes having a frictional braking material thereon.

Enormous amounts of heat are generated between the friction surfaces which rapidly raises their temperature. This heat flows outwardly from these surfaces at rates and in amounts dependent upon temperature differentials, the heat conductivity and the dimensions of the materials immediately adjacent to the friction surfaces. As the brake lining on the shoes has a poor heat conductivity, almost all of the heat generated must be conducted outwardly through the metal of the brake drum in order to be dissipated. This heat raises the drum to elevated temperatures, and as the drum reaches such elevated temperatures, the heat is dissipated either, and desirably, into the atmosphere or, and undesirably, to other parts of the wheel and brake, either by conduction, radiation, or convection. The heating of the drum and the other parts of the wheel and brake results in various deleterious effects on the operation of the brake.

Thus, as the drum heats, it expands in a direction away from the brake shoes. If the expansion is sufficiently severe or if the brake shoes are badly worn, or both, it is possible for the brake drum to expand beyond the limits of movement of the brake shoe operating mechanism with the result that the shoes no longer can be made to frictionally engage the brake drum.

A further difficulty from such expansion results from the fact that the brake drum is rigidly supported or connected to the wheel at one axial end only and the support restrains the expansion of the drum at this end. The other end of the brake drum is unsupported and more freely expands resulting in a tapered braking surface termed "bell mouthing." Bell mouthing is further aggravated by non-uniform forces of the brake shoes on the brake drum. These forces are usually in just two directions and can reach very high values which force the drum into an elliptical shape.

In either event, the brake shoes resist conforming to these changes and uneven contact pressures and high local heating of the friction material results.

In some instances of severe cases of heating, enough heat is conducted or radiated to the hydraulic operating mechanism for the brake that the fluids therein are heated to the vaporizing temperature in which case the mechanism becomes entirely ineffectual.

In any event, a dangerous result called "fade" often and usually follows after severe and heavy braking efforts.

The present invention, to a large extent, deals directly with these problems.

A still further difficulty with the internally expanding brakes has been in dissipating the generated heat in the brake drum to the surrounding atmosphere. Thus, the drum braking surface faces radially inwardly and its cooling or heat dissipating surface must then of necessity face primarily radially outwardly. Because it is desirable to make the brake drum as large as the wheel will permit, there is little air space between the brake drum and wheel rim through which cooling air can be directed over the outer surface of the brake drum. Radiation of heat to the wheel rim and possible damage to the tire bead can result. Furthermore, because of the centrifugal forces on the air itself, directing cooling air onto this outwardly facing cooling surface is difficult without a complicated system of "air pumping."

While contracting band brakes will obviate some of the above disadvantages, they have never been used heretofore because of the space requirements outside of the brake drum for the band and its operating mechanism, because of dirt problems, and because of the difficulty of cooling or dissipating the generated heat.

In the past contracting band friction brakes have not been extensively used in high production items such as motor vehicles because such brakes have heretofore required a substantial number of machined components which increased the overall cost of the brakes. Further, the contracting band friction brakes, although admittedly advantageous for various reasons, were not used because they required an excessive amount of space which was not available, especially in vehicles such as automobiles wherein the space for the brakes is limited by the steering mechanism and the axle supporting structures.

The present invention contemplates a new and improved friction brake particularly adapted for automobiles which overcomes all of the above-referred to difficulties, and other, and provides a brake which is simple in construction, positive in operation under even the most severe braking conditions, and is so arranged that the heat generated will not adversely affect the operation of the brake. Further, the present invention contemplates a number of structural features which substantially reduce the number and size of components necessary for mounting and operating a contracting band friction brake.

In accordance with the present invention, there is provided in a contracting band friction brake, a brake drum having an outwardly facing, cylindrical braking surface, a cylindrically extending brake band surrounding the drum and having a pair of spaced ends movable toward and away from each other to engage and disengage respectively the band with the braking surface, means spaced from the end of the band for holding the band against circumferential movement with respect to the drum, the improvement comprising: means for moving the ends of the band toward and away from each other, this moving means having a path of movement such that the entire length of the band will simultaneously engage the braking surface.

In accordance with still a further aspect of the present invention there is provided, in a contracting band friction brake of the type having a rotatable ring-shaped drum with an outwardly facing, cylindrical braking surface, a stationary frame, a band coextensive with the surface and having a free end, and means for contracting the band against the braking surface of the drum, the improvement comprising: the above-mentioned means including, in combination, the frame being axially spaced from the drum, a generally L-shaped lever having a first and a second substantially flat leg, the first leg being parallel with the frame and pivotally mounted thereon, the second leg extending axial with respect to the drum and radially spaced from the drum, and means for connecting the second leg onto the free end of the band so that movement of the lever contracts the band.

In accordance with another aspect of the present invention there is provided, in a contracting band friction brake of the type having a rotatable drum with an outwardly facing, cylindrical braking surface, a stationary frame, a band coextensive with the surface and having two free ends, and lever means for forcing the free ends together to contract the band against the braking surface, the improvement comprising: an anchor on the contracting band and between the free ends which anchor defines a self-energizing portion of the band, a resilient torque responsive means for coupling the anchor to the stationary frame, a first bearing member on the self-energizing portion of the brake band, a second bearing member on the stationary frame, these members being circumferentially aligned and normally spaced from each other so that circumferential displacement of said band against the resiliency of the torque responsive means will cause the bearing members to abut one another.

The principal object of the invention is the provision of a new and improved automobile brake which is simple in construction, has improved operating characteristics and is economical to manufacture.

Another object of the invention is the provision of a new and improved arrangement for directing the ends of a brake band into engagement with an internal brake drum such that the brake band will simultaneously engage the brake drum over its entire circumference both when new and when worn.

Another object is the provision of a new and improved arrangement for forcing an external brake band into engagement with the brake drum which occupies a minimum of space outwardly of the band.

Another object of the present invention is the provision of a contracting band friction brake which requires only a few number of easily manufactured parts.

Another object of the present invention is the provision of a contracting band friction brake having a band actuating lever that is mounted on the axial mid-plane of the brake drum to eliminate or substantially reduce force couples between the pivotal structure of the lever and the point at which the lever contracts the brake band. By this arrangement an even braking effect is transmitted from the lever to the braking surface of the drum.

Still another object of the present invention is the provision of a contracting band friction brake having a band with two free ends that are movable toward and away from the braking surface of a drum, which brake has lever actuators and means forming an axial swivel connection for joining the actuators onto the free ends of the brake band to assure even engagement of the brake band with the braking surface.

Yet another object of the present invention is the provision of swivel connection means as defined above which includes a block on the free end of the brake band and having a bearing surface, and a bearing surface on the lever actuator which bearing surfaces contact each other and transmit force from the actuators to the band ends.

A further object of the present invention is the provision of a contracting band friction brake of the type having a rotatable drum with an outwardly facing, cylindrical braking surface which brake has simplified means for mounting the contracting band with respect to a stationary portion of the brake and for preventing circumferential movement of the band with the drum.

A further object of the present invention is the provision of a contracting band friction brake with an accurate, inexpensive and durable torque limiting device.

Yet another object of the present invention is the provision of a contracting band friction brake having a resilient means for allowing circumferential rotation of the band a distance corresponding to the torque transmitted by the brake, and an abutting means on the band and spaced from the resilient means for preventing rotation of the band beyond a predetermined distance.

The invention may take physical form in certain parts and arrangements of parts, a preferred embodiment of which will be described in detail in this specification and illustrated in the accompanying drawings which form a part hereof and wherein.

Figure 2:
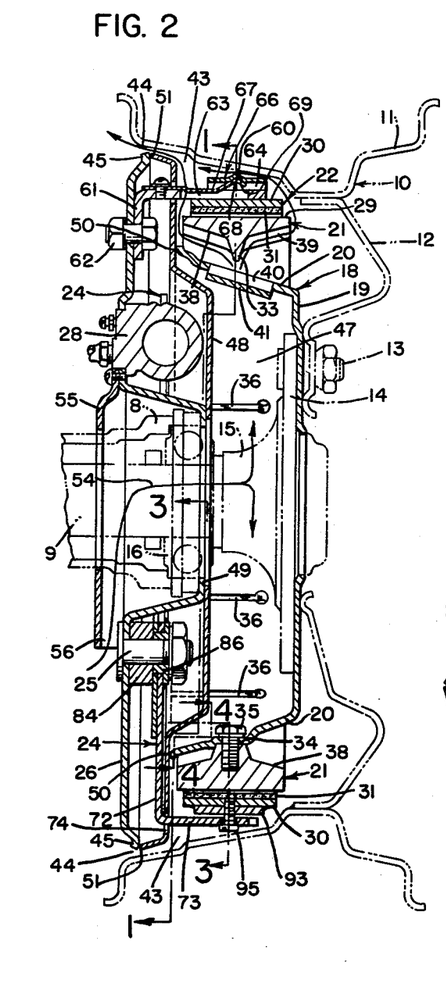
FIGURE 2 is a side cross-sectional view of FIGURE 1 taken approximately on the line 4—4 thereof with the wheel axle, axle hub and wheel shown in phantom lines.

Referring now to the drawings wherein the showings are for the purposes of illustrating a preferred embodiment of the invention only, and not for the purpose of limiting same, FIGURE 2 shows, in phantom, an automobile wheel 10 comprised generally of an outer rim 11 and an inner disc 12 removably mounted by means of studs and nuts 13 on a radially extending flange 14 of a wheel hub 15. This wheel hub in turn is mounted on an axle 9 rotatably supported in a roller bearing 16 mounted in an axle housing 8.

A brake drum supporting hub 18 has a radial flange 19 removably fixed as by bolts not shown to the wheel hub flange 14 and a flange 20 extending generally outwardly and in an axial direction on which a brake drum 21 is mounted.

The brake drum 21 is surrounded by a radially contracting brake band 22, the ends 23 of which are moved towards each other in order to contract the band by means of a pair of actuating levers 24 pivotally supported on pivot pins 25 in turn mounted on a back plate 26 fastened to the axle housing 8.

The actuating arms 24 are operated by a hydraulic mechanism 28 also mounted on the back plate 26.

The brake drum 21 has an outwardly facing cylindrical braking surface 29 of a width which when considered with the diameter thereof provides the desired area of braking surface. The brake band 22 is comprised of an outer band of metal 30 and an inner band or layer of frictional material 31, which engages the braking surface 29 to exert a braking action thereagainst. The heat generated by such braking action raises the temperature of the engaging surfaces. As the friction material 31 has a relatively poor heat conductivity, most of the heat must be dissipated by flowing radially inwardly in the brake drum 21, and in accordance with the present invention, the cross-sectional shape dimensioning and mounting of the brake drum 21 are such as to minimize the distortions of the braking surface 29 from a true cylinder.

Thus, the brake drum 21 has a transverse cross-sectional shape which is symmetrical about the radial plane therethrough which is located midway between its opposite axial ends and in the preferred embodiment is such as to provide a radially inwardly and circumferentially extending rib 33 on said radial plane, the outer surfaces of which diverge radially outwardly and symmetrically to the axial ends of the drum 21. Furthermore, the drum 21 is mounted on the drum supporting hub 18 so that the points of fastening are located on this axial mid-plane. Thus, in the embodiment shown, the rib 33 has a plurality of circumferentially spaced flats 34 corresponding to flats on the flange 20 and bolts 35 extend through the flange 20 into the drum 21 securing the two permanently together. Obviously the flange 20 on the hub could be welded to the brake drum preferably on the radial plane through the brake drum located midway between the opposite axial ends of the brake drum.

It is to be noted that the drum supporting hub only engages the brake drum 21 at these circumferentially spaced points, and is otherwise radially spaced therefrom by which arrangement, in accordance with the invention, a minimum amount of heat will be conducted to the supporting hub 18. Obviously heat insulating means could be provided in the form of a non-metallic washer between the hub 18 and the drum 21 to prevent any metal to metal contact between the two, and thus reduce the conduction of heat to the hub 18 to a minimum.

Further in accordance with the invention, the hub 18 is so arranged as to provide a slight degree of radial flexibility such that the drum 21 may expand and contract with a minimum restraint imposed by the hub 18. In the embodiment of the invention shown, this is accomplished by means of the flange 20 extending generally at a sharp angle of from 90–135° relative to the flange 19. If additional flexibility is required, axial slots 36 opening to the outer end of the flange 20 may be provided.

It is further to be noted that the radially inwardly facing surface 38 of the brake drum 21 is a cooling surface from which the heat generated by the braking action can be dissipated. To increase the heat radiating surface, a plurality of fins 39 may be provided which fins 39 extend in an axial direction. As such, they not only increase the area of the cooling surface very substantially, but they also serve as structural members supporting the outer edges of the brake drum and transmitting the forces imposed thereon to the center plane for transmittal to the supporting hub 18. By this arrangement, greater rigidity of the brake drum 21 across the braking surface 29 results and thus the tendency to distort is further reduced.

In this respect, and to further reduce the tendency or possibilities of the braking surface 29 to distort, the inner diameter of the brake drum 21 is at least 75%, and preferably 85%, of the diameter of the braking surface 29. By this limitation, a two-fold result follows, namely, the radial thickness of the drum 21 is sufficiently small that substantially all portions of the drum will be heated to approximately the same temperature. Thus, temperature differential distortions are eliminated. Furthermore, the rib 33 does not have sufficient radial rigidity to prevent expansion of the axial mid-portions of the braking surface 29 while permitting radial expansion of the axial ends thereof.

Figure 4:
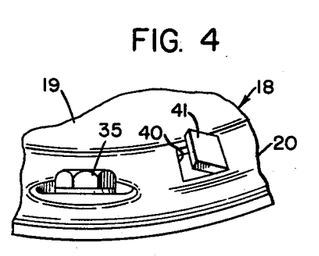
FIGURE 4 is a fragmentary side view of portions of FIGURE 1 showing the air scoops for directing the cooling air onto the brake drum, taken on line 4—4 of FIGURE 2.

Further in accordance with the invention, means are provided for directing a high velocity of air directly onto the cooling surface 38. While such means may take a number of different forms in the embodiment of the invention shown, the flange 20 has a plurality of openings 40 therethrough, with an air scoop 41 arranged to force air through the opening 40 directly onto the surface 38. In the embodiment of the invention shown, the openings 40 and the scoops 41 are formed by shearing a tongue from the flange 20 and bending such tongue radially inwardly such that the free end of the tongue faces in the direction of forward rotation of the wheel 10. With this arrangement, the scoops 41 scoop up air and force it radially outwardly directly onto the rib 33 where it divides and flows generally in both axial directions along the surfaces 38 and the cooling ribs 39, thence radially outwardly into the space 43 just inwardly of the wheel rim 11 and thence in to the free air through the space 44 between the wheel rim 11 and the outer edge 45 of the back plate 26. The cooling air thus cools the brake drum 21 and the wheel rim 11.

A shield plate 48 is fastened at its inner edge to the inner periphery 49 of the back plate 26 and its outer edge 51 engages the outer edge 45 of the back plate 26, and is otherwise in spaced relationship thereto to provide a heat and dirt shield separating the hydraulic mechanism 28 and the operating arms 24 from the brake drum 21 and the cooling blades 41. The free end 50 of the flange 20 is close spaced to the shield plate 48 providing a substantially closed chamber 47 inwardly of the blades 41 and preventing the circulation of air around the end 50. A rotating seal could be employed if desired or necessary. It is to be noted that the flange 20 and the shield plate 48 protect the hydraulic mechanism and the operating arms 24 from the direct radiation of heat from the brake drum 21, and also separate them from the chamber 47 through which cooling air with its contaminates is circulated.

The cooling air which the scoops 41 blow outwardly from the chamber 47 is replaced in accordance with the invention, in such a manner that the fresh air coming in first flows over the axle housing 8 and the wheel bearings 16. Thus, the back plate 26 and the shield plate 48 (see FIGURE 5) are provided with circumferentially extending slots 52, 53, respectively, through which the cooling air flows in a path as indicated by the arrow 54.

Figure 5:
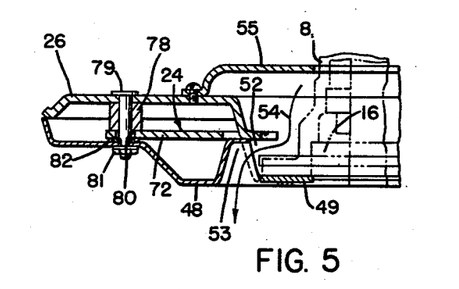
FIGURE 5 is a fragmentary cross-sectional view of FIGURE 1 taken approximately on the line 5—5 thereof.

In order to prevent this inflow of cooling air from carrying with it dirt and moisture, a dirt shield 55 is provided, fastened at its upper edges and side edges to the back plate 26, but spaced from the back plate 26 at its lower edge to provide a downwardly facing air port 56. Thus, dirt and water must follow a tortuous path in order to enter the chamber 47. The shield 55 may be arranged so that the port 56 faces in the direction of forward motion so that the shield 55 acts as an air scoop.

It is to be noted that by virtue of the wheel disc 12, and the other construction as shown, the cooling surfaces 38 of the brake drum 21 are completely shielded from any dirt or the like splashing directly thereon, and will thus remain substantially clean through continued use under adverse conditions so that the surfaces 38 may always have the maximum efficiency of heat dissipation.

It is to be noted that the arrangement for bringing the cooling air into the brake over the various operating parts of the wheel, and then directing the air in a direct blast onto the cooling surface and then continuing the air on outwardly where it can continue to cool parts of the wheel rim is considered to be an important part of the present invention.

Furthermore, the provision of the heat shield 48 and flange 20 prevents the direct radiation of heat under the hydraulic mechanism 28 as well as onto the bearings 16 is also considered to be an important part of the successful operation of the brake with the present invention.

The brake band 22 may be of any known or desired construction, either all metal or as shown of an outer metal band 30 and an inner layer 31 of conventional friction material. The purpose of the metal band 30 is primarily to transmit the tension forces imposed on the brake bnad 22 during braking operations. Preferably, in accordance with the invention, the brake band 22 is as flexible as possible, and the metal band 30 is kept as thin as possible.

Figure 1:
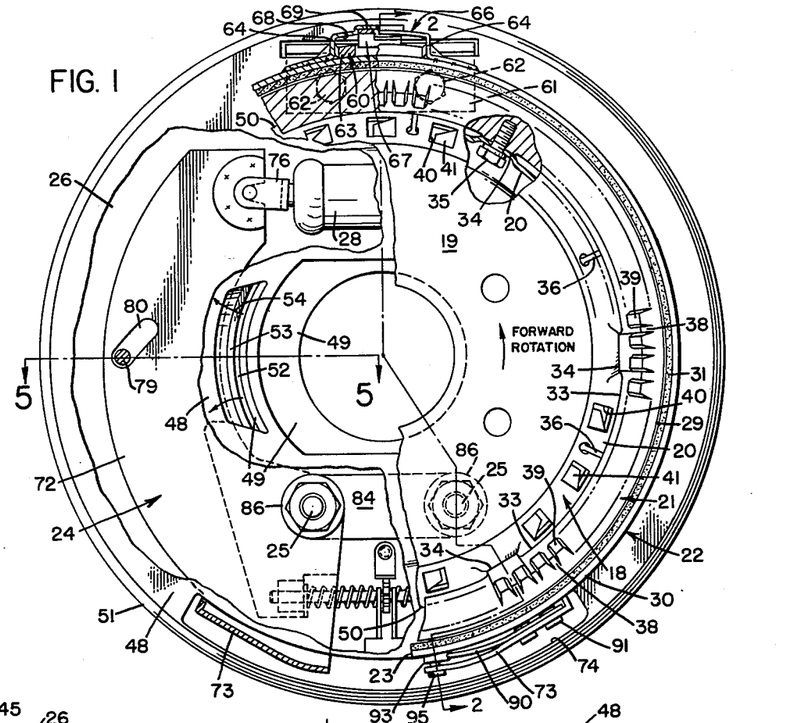
FIGURE 1 is a front side elevational view, with portions broken away generally on the line 1—1 of FIGURE 2 of an automobile brake illustrating a preferred embodiment of the invention, the brake being shown in the retracted or unengaged position.

The brake band 22 is held against rotation with the drum 21, when in frictional engagement therewith, by means of an L-shaped bracket member 60 having one of its legs 61 fastened to the back plate 26 in any suitable manner, for example, the nut and bolt 62, and the other of its legs 63 extending axially outwardly over the upper surface of the band 22, and between the legs 64 of an inverted U-shaped bracket 66 fastened to the outside of the metal band 30. A spring member 67 biased upwardly engages the under side of the base 68 of the bracket 66, and urges the band upwardly against the force of gravity to prevent any tendency of the band 22 to sag against the brake drum 21 when no braking action is desired. This spring 67 also has means for aligning the brake band 22 axially relative to the brake drum 21. In the embodiment shown, the spring 67 and the base 68 of the bracket 66 have cooperating wedge surfaces 69 extending in a circumferential direction for this purpose. The spring 67 also performs the function of preventing the brake band 22 from rattling when the wheel is subjected to bumps and the like.

The bracket 66 and the bracket 60 are shown as being located midway between the ends 23 of the brake band 22 so that, as will appear, one-half of the brake band when engaged with the brake drum 21 will be self-energizing. If the degree of self-energizing is to be varied the location of the bracket 60 relative to the ends 23 may be varied as desired.

For the purpose of moving the ends 23 towards each other, and thus engaging the brake band 22 with the brake drum 21, the operating levers 24 are provided, which operating levers, as will appear, are so constructed as to occupy the minimum radial distance outwardly of the brake band 22 at a maximum of rigidity. The levers 24 are so mounted as to have the maximum resistance against twisting.

The levers 24 are identical to each other except for being rights and lefts and the description of one should suffice for both. Thus, each lever 24 is formed preferably by stamping from a flat sheet of metal to provide a portion 72 generally flat in a radial plane and having a substantial radial width. This portion 72 is located in the radial plane beyond the axial end of the brake drum 21 and separated from the drum by means of the heat shield 48. The lever 24 also includes a circumferentially-wide, axially-extending portion 73 which passes through an opening 74 in the shield plate 48 over and in close spaced relationship with the outer surface of the brake band 22 adjacent to but spaced from the ends 23.

The portion 72 extends generally circumferentially and the hydraulic mechanism 28 has a connecting rod 76 which engages the end remote from the portion 73 thereof for the purpose of actuating the brake band 22.

Figure 3:
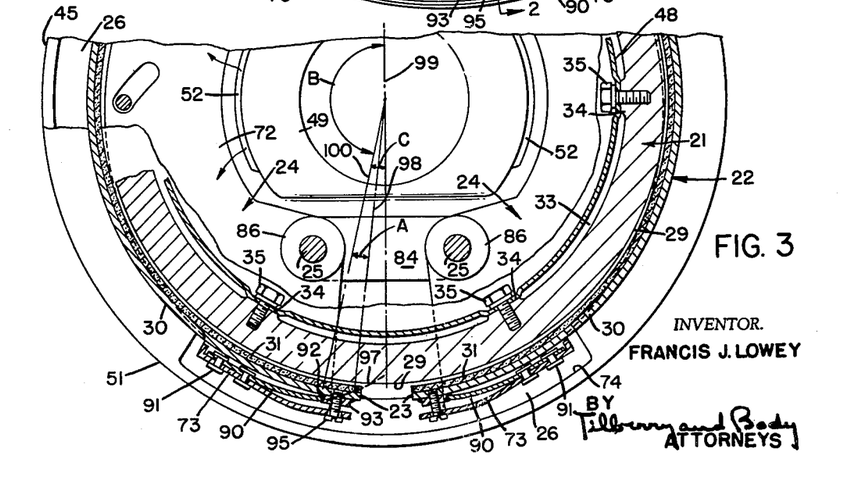
FIGURE 3 is a fragmentary side cross-sectional view of FIGURE 2 taken on the line 3—3 showing in detail the brake band operating mechanism.

These arms or levers 24 are so mounted as to resist the forces imposed thereon with a minimum amount of twisting. Thus, at a point substantially spaced from the pivot pins 25, support means are provided for the arm 72. In the embodiment shown, such support means comprise a sleeve 78 extending between the back plate 26 and the arm 72 which sleeve 78 is held in position by means of a pin 79 extending through the sleeve 78, a slot 80 in the arm 72, and an opening in the heat shield 48 where the pin 70 is held in position by means of a nut 81. A small spring 82 interposed between the shield 48 and the arm 72 biases the arm 72 into sliding engagement with the end of the sleeve 78. It will be noted that the slot 80 is either arcuate or tangent to the circle having a center of radius corresponding to the pivot pin 25.

Thus, forces imposed on the arm portion 73 when it is desired to actuate the brake, and which are offset from the plane of the arm 72, exert a twisting action on the lever 24. Such twisting action is resisted by the sleeve 78.

Further, to resist the very substantial forces which are imposed on the levers 24, a link member 84 is provided through which both pivot pins 25 extend.

A bushing 86 surrounds the pin 25 and pivotally supports the arm 24 on this pin 25. Additionally, it is to be noted that the operating levers, by virtue of the construction described, are light in weight with a maximum of rigidity in the direction of the actuating force, resulting in reduced cost of manufacture, reduced unsprung weight, and a minimum of axial space.

The operating levers 24 are so arranged with the brake band 22 that the brake band 22 will engage and disengage the braking surface 29 simultaneously over its entire length, and this result will hold for all degrees of wear of the friction material 31.

In the embodiment of the invention shown, the operating levers 24 actuate the band 22 through a compression member 90. This member may take a number of different forms and may be mounted in a number of different ways. In the embodiment shown, it is in the form of a leaf spring fastened at one end to the inner surface of the axial extending portion 73 by any suitable means, such as the rivets 91, and at the opposite end is curved to pivotally engage a similar curved circumferentially facing thrust surface 92 on the edge of a thrust block 93 suitably fastened as by welding to the outer surface of the brake band immediately adjacent the end 23. The member 90 may tend to buckle when substantial compression forces are placed thereon. In such case it buckles into engagement with the rigid arm 73. The member 90 is also biased at its band end in a radially inward direction, and this bias is resisted by an adjusting screw 95 extending radially inwardly through an opening in the end of the axially extending portion 73 into a threaded opening in the thrust block 93. By use of the screw 95, the spacing of the ends 23 from the braking surface 29 in the non-engaged position may be readily adjusted. Also the screw 95 provides the function of retracting the ends 23 from the braking surface 29 when it is desired to release the brakes.

The braking action, however, is applied through the resilient member 90 acting on the curved surface 92. In effect, this is a pivoted driving connection. No pivot pin with its resulting radial bulk is required, however.

It will be appreciated that the ends 23 must be moved in both a radial and a circumferential direction in order to bring the brake band 22 into engagement with the braking surface 29, the resultant of these two movements being indicated by the path of movement 97.

In accordance with the invention, the path of movement 97 is so selected that the entire brake band comes into and out of pressure contact with the braking surface simultaneously. Obviously if the path of movement is too parallel to the brake surface, the end 23 will not engage the braking surface. If the path of movement 97 is too steep, that is, too radial, the end 23 will engage the surface first. In either event, uneven braking pressures and uneven wear result.

The path of movement 97 of the center of the curved surface 92, where the braking thrust is delivered to the brake band, must be controlled within very close limits, defined by the formula $A = B(1-R)/(R+r)$ wherein: $B$ = the angle between the radial line 98 through the center of curvature of surface 92 when the band first engages the braking surface 29, and the line 99 through the center line of the bracket 60; the angle $A$ = the angle between the line 98 and the line 100 through the center of curvature of surface 92 as the surface 92 is retracted from the line 98; $R$ = the diameter of the braking surface 29, and $r$ = the radial movement of the point 92 as the brake band is retracted or advanced.

The path of movement 97 may be further defined in rectangular coordinates by the formulas $X =$ tangent $(C+A)Y$ and $y =$ cotangent $(C+A)X$ where $$C = 180° - B$$

The desired path of movement may be obtained in any one of a number of different ways, but in the preferred embodiment, the location of the pivot pins 25 is so selected as to be either the center of curvature of the path of movement 97, or as close thereto as possible so that for the short arc of movement of the end 23, the arc having a center on the pivot pin 25 will almost exactly coincide with the path of movement 97.

If any error in the line of movement 97 is to be allowed, it should be in favor of having the ends 23 engage the drum first whereby any dust or dirt on the braking surface 29 will be brushed off.

It is to be further noted that with such error, the resilient thrust arms 90 will flex slightly to allow for any discrepancies as the ends 23 are brought into engagement with the brake drum 21. The arms 90 in effect form a pivoted connection to the ends 23. Also, by virtue of the portions 73 being radially outside of the thrust arms 90, if thrust pressures are reached, sufficient to buckle the arms 90, they simply move into supporting engagement with the inner surface of the portions 73.

Figure 6:
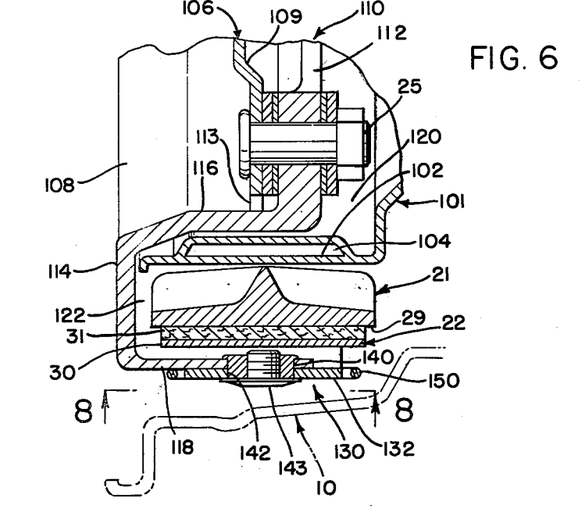
FIGURE 6 is a cross-sectional, partial view illustrating a modification of the embodiment disclosed in FIGURE 2 and taken along line 6—6 of FIGURE 7.
Figure 7:
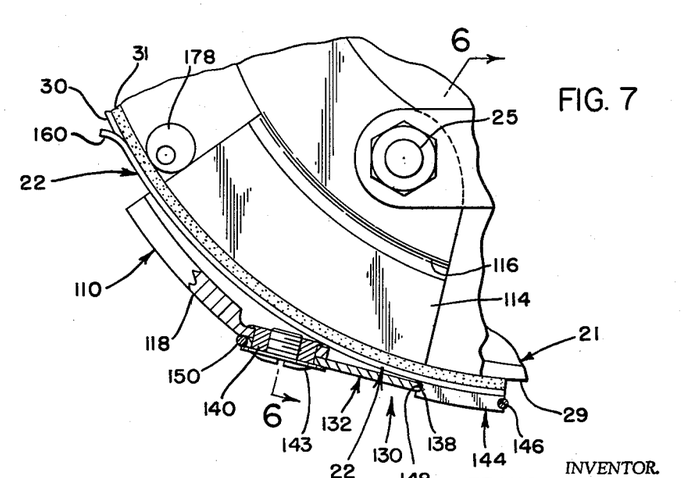
FIGURE 7 is a cross-sectional, partial view showing a modification of the embodiment disclosed in FIGURE 3.
Figure 8:
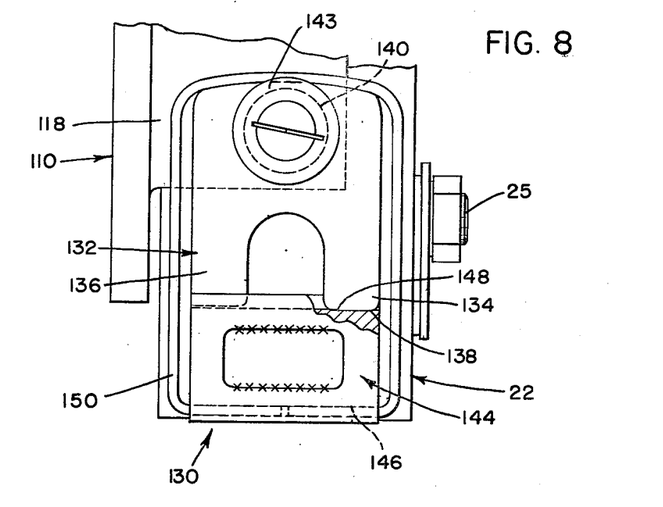
FIGURE 8 is a partial view taken along line 8—8 of FIGURE 6.

Referring now to FIGURES 6–8, showing a modification of the preferred embodiment as disclosed in FIGURES 1–5, there is provided a hub 101 having a cylindrical flange 102 which flange extends axially into brake drum 21. To cause forced circulation of air through the flange 102, there is provided a number of louvers 104 which are lanced and drawn from the flange and are shaped to form air scoops. In accordance with this modification of the brake, there is further provided a back plate 106 which is similar to back plate 26 in the embodiment of FIGURES 1–5 with the exception that the back plate has a toroidal recess 108 adapted to receive the drum 21 and band 22 as a unit so that the recess surrounds substantially three sides of these members. By so forming the back plate 106, there is provided a central wall 109 that is substantially in the axial mid-plane of the drum 21 and thus the band 22. This location of the center wall 109 results in benefits that will hereinafter be described in detail.

To actuate the brake band 22, the brake includes a pair of operating levers 110, only one of which is shown, having a body portion 112 substantially parallel with the center wall 109 and connected to appropriate actuating means, such as a cylinder 28, as is shown in FIGURES 1 and 2. The lower end of lever 110 terminates in a generally U-shaped portion 114 having an upper leg 116 and a lower leg 118, which legs swing on opposite radial sides of the drum 21. By positioning the drum 21 and band 22 within the toroidal recess 108 there is provided a very compact contracting band friction brake. The operating force exerted by body 112 is substantially aligned with the axial mid-point of drum 21 and the U-shaped portion 114 allows force transmission directly to the band 22 at a position aligned with the body 112 so that substantially no force couples are established between the body 112 and leg 118. This geometry of lever 110 which is accommodated by the contour of back plate 106 is an improvement over the geometry of the brake shown in FIGURES 1–5 and substantially reduces the stresses within the brake when high braking forces are exerted on the levers.

The lower leg 118 of the U-shaped portion 114 corresponds with the portion 73 of lever 24 as shown in FIGURE 2. It is noted that the axial dimension of the brake unit has not been increased by providing a U-shaped portion 114 on lever 110. In essence, the actuating lever 110 still comprises a first portion parallel to the back plate of the brake and a second portion extending axially on the radial outward side of the brake band to actuate the band.

Hub 101 rotates with drum 21 and the louvers 104 pump air from a first chamber 120 into a second chamber 122 so that the forced air travels in a radially outward direction from the interior chamber 120 to the exterior chamber 122. Heat generated in chamber 122 during the braking operation is carried by the forced air stream away from the interior of the brake so that a substantial thermal differential is realized between chamber 120 and chamber 122. This simplified arrangement for pumping cooling air directly onto the drum 21, provides a sufficient cooling effect for the brake and does not substantially increase the cost of the brake unit.

The embodiment of the invention as shown in FIGURE 3 utilizes a thrust arm 90 for exerting a generally tangential and radially inward force on the free ends of brake band 22. This same function is performed in the embodiment shown in FIGURES 6–8 by an actuator 130 having a resilient finger 132 provided with tabs 134 and 136. Each of these tabs terminates in a bearing surface 138 for a purpose to be hereinafter described. To secure the finger 132 onto the leg 118 of lever 110, a bushing 140 passes through an aperture 142 in the finger and is locked in place by a bolt 143 having a relatively large head. Welded or otherwise secured onto the outer surface of metal band 30, there is provided a bearing block 144 provided with a groove 146 at one end thereof and a bearing surface 148 at the other end, which bearing surface coacts with bearing surface 138 of the finger 132 to provide a swivel connection between the finger and the block. To hold the unit as so far described in the assembled position, a snap ring or locking band 150 is received under the head of bolt 143 and in groove 146. The manner of mounting the finger 132 is evident from the drawings and further discussion is not necessary.

In operation of the actuator 130, as the lever 110 is pivoted around pin 25, a force is exerted through finger 132 against block 144. The swivel connection between surfaces 138 and 148 allows proper alignment of the finger with respect to the block in all positions of the lever 110. By providing a relatively stiff finger 132, a substantial force can be exerted on the band 22 without collapse of the finger. It is to be appreciated that an actuator 130 is positioned adjacent both ends of the band 22 as is shown in FIGURE 3 which illustrates another embodiment of the present invention; however, since the actuators are essentially identical only one is shown.

Figure 9:
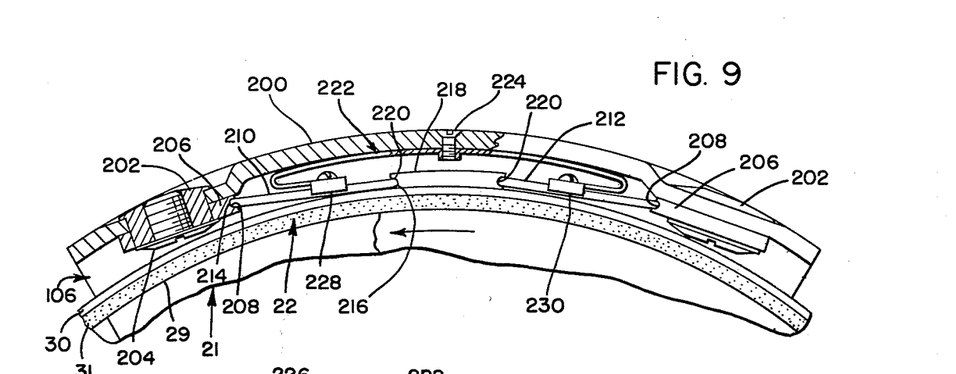
FIGURE 9 is a cross-sectional, partial view illustrating a modification of the embodiment shown in FIGURE 1.
Figure 10:
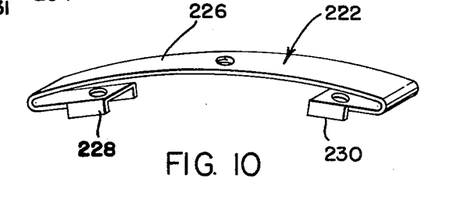
FIGURE 10 is a perspective view illustrating one component of the contracting band friction brake as shown in FIGURE 9.

Referring now to FIGURES 9 and 10, there is illustrated a further aspect of the present invention wherein the band 22 is supported onto back plate 106 by a pair of fingers extending from the back plate to the band. This function can be accomplished in a variety of structural embodiments; however, in accordance with the preferred embodiment of the present invention, the back plate 106 is provided with a cap 200 extending axially over the braking surface 29 and radially outward from the metal band 30. Supported at spaced intervals on cap 200 are a pair of bushings 202 secured onto the cap by appropriate means such as bolts 204. In this manner, the bushings support bearing blocks 206 onto the under surface of the cap 200 so that bearing surfaces 208 of the separate blocks face each other. The bearing blocks may receive coupling fingers 210, 212 having terminating bearing tips 214, 216. Secured onto the upper surface of metal band 30 there is provided a bearing block 218 having oppositely facing bearing surfaces 220 each of which faces a bearing surface 208 of the bearing blocks 206 so that the tips 214 and 216 of the respective fingers 210, 212 are pivotally received by these bearing surfaces. The bearing blocks 218 define a self-energizing portion of the brake band 22 extending in the general direction of finger 210 and a non-self-energizing portion extending in the general direction of finger 212. In accordance with the preferred embodiment of the present invention, finger 212 is bowed slightly, which feature is not shown in the drawing, to exert a compressive force on the finger 210. This rigidly secures the block 218 between blocks 206.

As is shown in FIGURES 9 and 10, in accordance with the preferred embodiment of the present invention the cap 200 is provided with a spring clip 222 secured onto the cap by a bolt 224 and having a strap 226 and spaced finger engaging portions 228, 230. This spring clip assists in holding the fingers 210, 212 in proper relationship with respect to the bearing blocks and also exerts a slight downward bias on the brake assembly to prevent unnecessary vibration.

In operation, the finger 212 biases the bearing blocks 218 against the finger 210 when the brake is not actuated.

The fingers 210, 212 can flex downwardly when the brake band 22 is contracted into engagement with the drum 21. At the time of band contraction, a substantial force is transmitted between bearing block 208 and 218 by finger 210 while the bowed finger 212 relaxes slightly, but not enough to allow disengagement of this finger from its bearing surface 220. It is within the contemplation of the present invention to secure the bearing blocks 206 onto the metal band 30 and bearing block 218 onto the cap 200.

Figure 11:
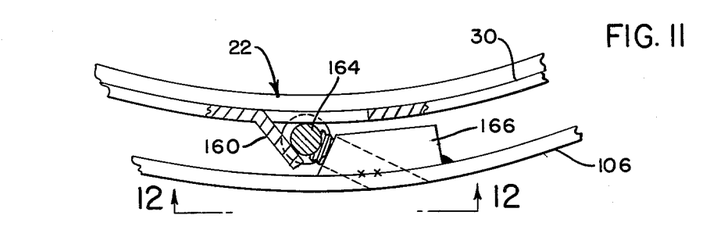
FIGURE 11 is a cross-sectional, partial view illustrating a further aspect of the present invention.
Figures 12, 13:
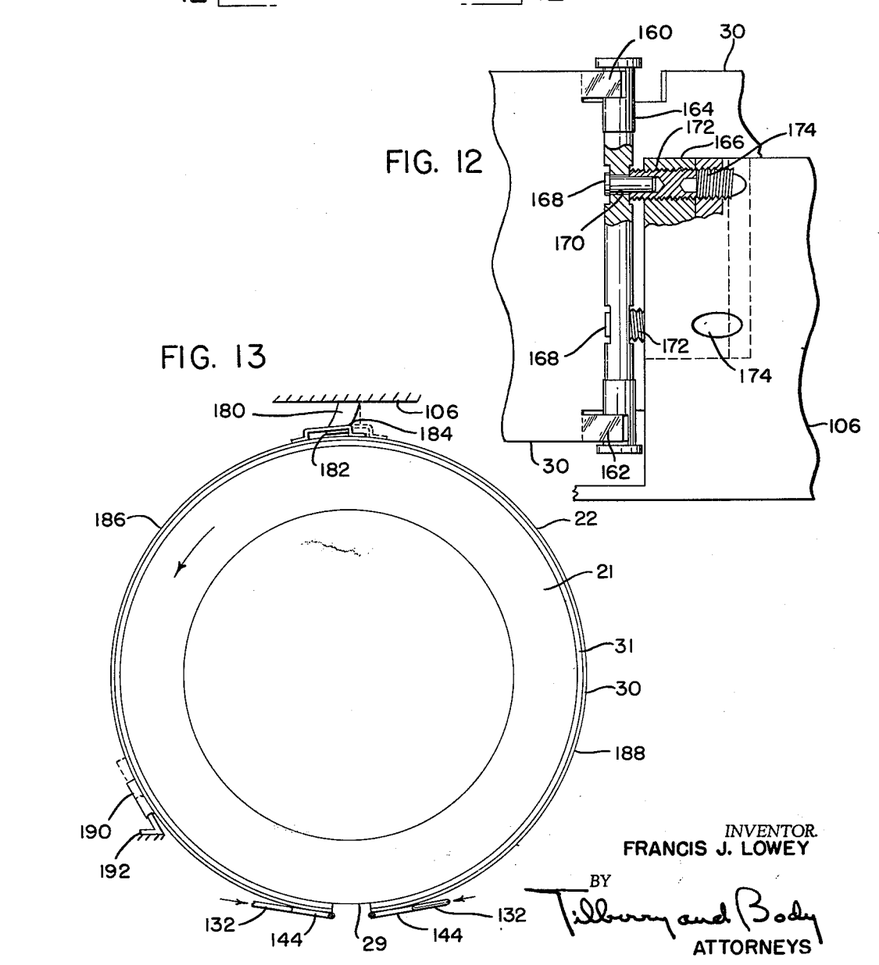
FIGURE 12 is a cross-sectional, partial view taken generally along line 12—12 of FIGURE 11.
FIGURE 13 is a schematic view of a further aspect of the present invention.

Referring now to FIGURES 11 and 12, there is shown a means for limiting the amount of radially outward movement of the brake band 22. Although various structural embodiments could be provided for this function, in accordance with the preferred embodiment as shown in FIGURES 11 and 12, there is provided a pair of lanced lugs 160, 162 on opposite edges of the outer metal band 30. Coacting with the lanced lugs is a generally axially extending stop bar 164 which is secured onto a stationary block 166 supported by appropriate means onto the back plate 106. To join the block and stop bar, there are provided pins 168 passing through and rotatably secured within apertures 170 and non-rotatably secured onto the ends of setscrews 172. These setscrews are threadably received within apertures 174 so that rotation of the setscrews adjusts the position of stop bar 164.

In operation, the stop bar is positioned so that the band 22 can be moved away from the drum 21 only a predetermined distance which distance can be adjusted by the setscrews 172. By appropriately shaping the lugs 160, 162 in accordance with the desired path of movement 97, the movement of the band can be more accurately controlled than a band without such a guide and stop means.

Referring now to FIGURE 7, the outer movement of levers 110 is limited, in accordance with the preferred embodiment of this invention, by a cam 178 positioned rearwardly of the levers. Of course, one cam is positioned opposite each of the levers.

Referring now to FIGURE 13, there is illustrated a further aspect of the present invention wherein a contracting band brake having a drum 21 and a band 22 is provided with an improvement comprising a means for limiting the braking torque between the band and the drum. Such a torque limiting means comprises essentially a resilient means for allowing circumferential rotation of the band 22 with the drum 21 a distance corresponding to the torque on the brake and an abutting means on the band spaced from the resilient means for preventing rotation of the band beyond a predetermined distance.

Although this can be accomplished by a variety of structural embodiments, in accordance with the preferred embodiment of this invention as schematically illustrated in FIGURE 13, the band 22 is provided with a resilient support 180 which is constructed of appropriate material such as spring steel wherein the deflection of this member in a circumferential direction is proportional to the torque between the drum 21 and the back plate 106 onto which the band 22 is secured. Of course, the resiliency of the support 180 is such that the deflection of the band is only slight and is not beyond the elastic limit of the support during the operating conditions of the brake. Resilient support 180 is provided with a generally axially extending arm 182 which is received within a bracket 184 appropriately secured onto the outer metal band 30. By this construction, the contracting band 22 is divided into a self-energizing portion 186 and a non-self-energizing portion 188 in a manner known in the brake art. Onto the self-energizing portion of band 22 there is provided an abutment 190 which is normally circumferentially spaced from an abutment 192 which is secured onto a stationary member, such as the back plate 106. The abutments 190, 192 are circumferentially aligned so that they will abut one another as the support 180 is flexed a given distance which corresponds to a predetermined torque exerted on the back plate 106.

In operation of the contracting band brake, as shown in FIGURE 13, the free ends of band 22 are forced together by finger 132 acting against bearing block 144 as has been previously explained. The torque exerted on the back plate 106 is determined by the braking effect between surface 29 and band 31. As the torque increases, the support 180 flexes toward the self-energizing portion 186. The flexing or displacement of support 180 does not change the braking effect of the brake unit until the deflection is such that the abutments 190 and 192 collide. When this happens, the portion of the brake between the abutments and the bracket 182 is now the self-energizing portion which is substantially lesser in length than the prior self-energizing portion. This causes a decreasing braking effect between the band and the drum. To control the torque of the brake, a number of abutments may be provided and the resiliency of these abutments or the resiliency of support 180 can be changed to obtain a wide variety of torque controls on the contracting band brake. This is a substantial advance in the art of controlling the torque exerted by a contracting band brake. In accordance with the invention, deflection of support 180 is the sole factor used in controlling the torque of the brake and the deflection is controlled only by the torque of the brake. Consequently, there is provided a direct correlation between the function to be controlled and the control means thereof without intermediate elements to increase the complexity and inaccuracies of the control means.

Thus it will be seen that a vehicle brake has been described in detail which accomplishes all of the objectives heretofore set forth, and others, and provides a brake wherein the operating parts of the wheel are protected from the heat generated wherein the heat generated is rapidly conveyed away by circulating air where such circulating air also cools other portions of the wheel where the brake drum will be distorted to the minimum, if at all, where even braking pressure will exist over the entire brake band a maximum diameter of braking drum service is provided wherein there is a minimum of unsprung weight and a maximum of strength. The invention has been described with reference to a preferred embodiment in sufficient detail to enable one skilled in the art to readily duplicate the invention. Obviously modifications and alterations differing radically from the exact embodiment shown will occur to others upon the reading and understanding of this specification, and it is my intention to include all such modifications and alterations insofar as they come within the scope of the appended claims.

Having thus described my invention, I claim:

1. In an externally contracting brake, a brake drum having an outwardly facing, cylindrical braking surface, a circumferentially extending brake band surrounding said drum and having a pair of spaced ends movable toward and away from each other to engage and disengage respectively said band with said braking surface, means spaced from said ends holding said band against circumferential movement, and actuation means for moving said ends toward and away from each other, said means having a path of movement such that the entire length of said band will simultaneously engage said braking surface, said actuation means pivotally engage the ends of said brake band and said means have a line of movement defined by the formula $A = B(1-R)/(R+r)$ where B equals the angle between the radial line through the pivot point when the band first engages the braking surface and the line through the center of the means preventing the band from moving circumferentially, the angle A equals the angle between the pivot point when the band first engages the surface and the pivot point when the band is retracted, R equals the diameter of the braking surface, and r equals the radial movement of the pivot point as the brake band is retracted or advanced.

2. In an automobile wheel brake, a brake drum having an outwardly facing cylindrical braking surface and rotatable on a brake axis, a circumferentially extending brake band having a pair of spaced ends on one side of said drum axis, a pair of operating arms each including a first portion pivoted on an arm axis parallel to the drum axis and between said drum axis and said ends and within the periphery of said drum, a second portion extending axially from said first portion radially outwardly of said band adjacent the ends thereof and means pivotally connecting said second portion and an end of said band and hydraulic means for pivoting said arms about said arm axes, said hydraulic means being on the opposite side of said drum axis from said arm axes, said first portion being flat in a plane extending radially outward from its pivotal axis and said second portion being generally flat in a circumferential and axial direction.

3. The combination of claim 2 wherein a thrust member is mounted at one end on the inner surface of said second portion and is pivotally engaged at the opposite end against the band adjacent the end thereof.

4. The combination of claim 3 wherein said opposite end of said thrust member is biased radially inwardly and radial adjusting means are provided between the end of said band and said second portion.

5. In a contracting band friction brake of the type having a rotatable drum with an outwardly facing, cylindrical braking surface, a stationary frame, a band coextensive with said surface and having at least one free end, means for supporting said band onto said frame and means for contracting said band against said braking surface, the improvement comprising: said contracting means comprising a thrust member movable axially inward and generally tangential to said drum and a means forming an axial swivel connection between said thrust member and the free end of said band, said free end of said band having a bearing block and said thrust member being adapted to exert a force against said block for contracting said band, latch means for securing said block against said thrust member, the latch means including a locking band extending generally from said thrust member and around said block.

6. The improvement as defined in claim 5 wherein said contracting means further includes a pivoted lever for operating said thrust member and said locking band being secured onto said lever.

7. In a contracting band friction brake of the type having a rotatable drum with an outwardly facing, cylindrical braking surface, a stationary frame, a band coextensive with said frame and having at least one free end, means for supporting said band onto said frame and means for contracting said band against said braking surface, the improvement comprising: said support means comprising a first member mounted onto the band and a second member mounted onto the frame, said members being aligned in a circumferential direction along said braking surface and in axially shiftable engagement with each other, said first member includes a pair of bearing surfaces on said frame and radially spaced from said band and a finger extending from each of said bearing surfaces, and said second member comprising abutments on said band for receiving said fingers, said fingers and said abutments being so arranged to prevent substantial rotation of said band with respect to said frame.

8. The improvement as defined in claim 7 wherein one of said fingers is yieldably compressed between its abutment and its bearing surface to exert a compressive force on said other finger.

9. The improvement as defined in claim 7 including a spring means secured onto said frame and onto each of said fingers for yieldably holding said fingers with respect to said frame.

10. In a contracting band friction brake of the type having a rotatable drum with an outwardly facing, cylindrical braking surface, a stationary frame, a band coextensive with said surface for substantially its complete circumferential length and having two free ends, and two levers each pivoted onto said frame on an axis for moving one of said free ends and for contracting said band against said braking surface, the improvement comprising: the levers being relatively flat in a direction axial to said drum, each of said levers extending across substantially the whole diametrical dimension of said braking surface, a portion of each of said levers extending axially with respect to said drum and adjacent said band for contracting said band, and guide means on said frame and spaced from said axis for guiding the movement of each of said levers.

11. The improvement as defined in claim 10 wherein said guide means for each lever comprises a boss on said frame for slidably engaging said lever, an arcuate slot in said lever and having a center of curvature at said axis, a pin extending from said boss into said slot and means for holding said lever in sliding engagement with said boss.

12. In a contracting band friction brake of the type having a rotatable drum with an outwardly facing, cylindrical braking surface, a stationary frame, a band coextensive with said surface and having two free ends, and lever means for forcing said ends together to contract said band against said braking surface, the improvement comprising: an anchor on said contracting band and between said free ends which anchor defines a self-energizing portion of said band, a resilient torque responsive means for coupling said anchor to said stationary frame, a first bearing member on said self-energizing portion of said brake band and a second bearing member on said stationary frame, said members being circumferentially aligned and spaced from each other so that circumferential displacement of said band against the resiliency of said torque responsive means will cause said bearing members to abut one another.

13. In a contracting band friction brake having a drum, a contracting band, a stationary frame and a means for supporting said band onto said frame, the improvement comprising: said support means securing said band onto said frame and including a resilient means for allowing rotation of said band with said drum a distance corresponding to the torque on said brake, a fixed abutment on said frame and an abutment on said band and spaced from said resilient means for contacting said fixed abutment and for preventing rotation of said band beyond a predetermined distance.

References Cited by the Examiner
UNITED STATES PATENTS

| | | | |
|---|---|---|---|
| 1,347,990 | 7/20 | Carter | 188—77 |
| 1,397,430 | 11/21 | Lankheet | 188—77 |
| 1,595,762 | 8/26 | Dumble | 188—77 |
| 1,680,319 | 8/28 | Capes | 188—77 |
| 1,715,340 | 5/29 | Carlson | 188—77 |
| 1,725,907 | 8/29 | Germonprez | 188—77 |
| 1,764,176 | 6/30 | Loughead | 188—77 X |
| 1,965,894 | 7/34 | Huck | 188—77 X |
| 2,027,874 | 1/36 | Nall | 188—77 X |
| 2,357,212 | 8/44 | Magee | 188—77 X |

ARTHUR L. LA POINT, *Primary Examiner.*

MILTON BUCHLER, *Examiner.*